United States Patent
Bormann et al.

[15] 3,674,801
[45] July 4, 1972

[54] 1,2,2A,3,4,5-HEXAHYDRO-1-(2-IMIDAZOLIN-2-YLAMINO)-BENZ[CD]INDOLES

[72] Inventors: Gerhard Bormann, Basel; John Gmunder, Muttenz/BL; Heinrich Wilkens, Brombach; Franz Troxler, Bottmingen Baselland, all of Switzerland

[73] Assignee: Sandoz Ltd., (also known as Sandoz AG), Basle, Switzerland

[22] Filed: Oct. 14, 1970

[21] Appl. No.: 80,748

[30] Foreign Application Priority Data

Oct. 24, 1969 Switzerland ..................... 15858/69
July 6, 1970 Switzerland ..................... 10182/70
July 6, 1970 Switzerland ..................... 10183/70

[52] U.S. Cl. .................... 260/309.6, 260/141, 260/313.1, 260/326.3, 260/326.5 S, 260/326.5 B, 424/273
[51] Int. Cl. .................................................... C07d 49/34
[58] Field of Search ............................................. 260/309.6

[56] References Cited

UNITED STATES PATENTS 3,288,805  11/1966  Berg ........................... 260/309.6
3,530,140  9/1970  Kummer et al. .................. 260/309.6

FOREIGN PATENTS OR APPLICATIONS 1,506,407  11/1967  France .......................... 260/309.6
1,541,179  8/1968  France .......................... 260/309.6
1,550,151  11/1968  France .......................... 260/309.6
1,016,514  1/1966  Great Britain ................... 260/309.6

*Primary Examiner*—Natalie Trousof
*Attorney*—Gerald D. Sharkin, Robert S. Honor, Frederick H. Weinfeldt, Richard E. Vila and Walter F. Jewell

[57] ABSTRACT

The present invention concerns compounds of the formula:

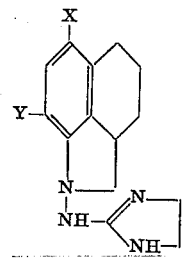

wherein
  X is hydrogen, halogen, methyl or methylthio and
  Y is hydrogen,
or
  X is hydrogen and
  Y is methyl,
or
  both X and Y are chlorine.

The compounds and pharmaceutically acceptable acid addition salts thereof are vasoconstrictors.

7 Claims, No Drawings

YLAMINO)-BENZ[CD]INDOLES

The present invention relates to new hexahydrobenzindole derivatives.

The present invention provides compounds of formula I,

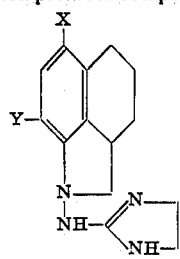

wherein
 X is hydrogen, halogen, methyl or methylthio and
 Y is hydrogen,
or
 X is hydrogen and
 Y is methyl,
or
 both X and Y are chlorine.

The present invention also provides a process for the production of a compound of formula I, comprising reacting a compound of formula II,

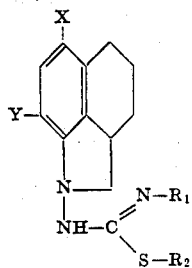

wherein
 X and Y are as defined above,
 $R_1$ is hydrogen or lower alkyl, and
 $R_2$ is lower alkyl,
with ethylene diamine.

The acid addition salts may be produced in known manner from the free bases and vice versa.

The compound of formula II is preferably reacted with ethylene diamine in the presence of an acid, and at least one of the reactants should partially be present as free base. When a compound of formula IIa,

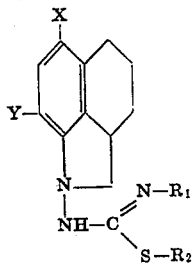

wherein
 X, Y and $R_2$ are as defined above, and
 $R_1'$ is lower alkyl,
is used, then a preferred compound is that wherein $R_1'$ and $R_2$ are ethyl or methyl. When a compound of formula IIb,

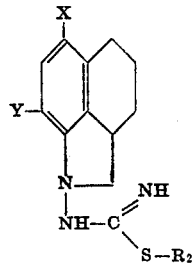

wherein X, Y and $R_2$ are as defined above,
is used, then a preferred compound is that wherein $R_2$ is methyl or ethyl.

The process may, for example, be effected by reacting an acid addition salt of a compound of formula II, e.g., the hydrochloride, hydrobromide, hydroiodide or hydrogen sulphate, with an excess of ethylene diamine. The excess of ethylene diamine may be such that the mol ratio of the salt of a compound of formula II: ethylene diamine amounts between 1 : 2 and 1 : 6. The reaction is preferably effected in an inert polar solvent, e.g., a lower alkanol such as ethanol or isopropanol, an amide of an organic carboxylic acid, such as dimethyl formamide, an open-chain or cyclic ether such as dioxane, or a mixture thereof with water. However, if desired, an excess of the ethylene diamine used may likewise serve as solvent. The reaction is conveniently effected at an elevated temperature, preferably at the boiling temperature of the reaction mixture, and generally has a duration 2 to 10 hours.

The imidazoline compounds of formula I, produced in accordance with the process described above, may be isolated in the usual manner as free bases or in the form of their acid addition salts and may be purified in accordance with known methods.

The compounds of formula II, used as starting materials, are new.

The new compounds of formula IIa may be produced by reacting a compound of formula III,

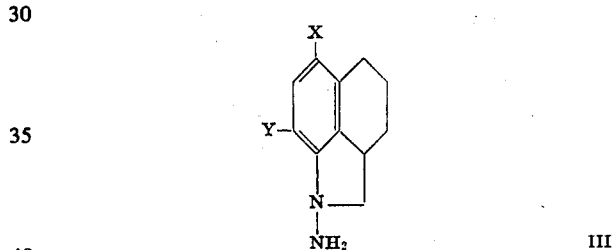

wherein X and Y are as defined above,
with a compound of formula IV,

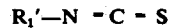

$$R_1'-N=C=S \qquad \text{IV}$$

wherein $R_1'$ is as defined above,
to give a compound of formula V,

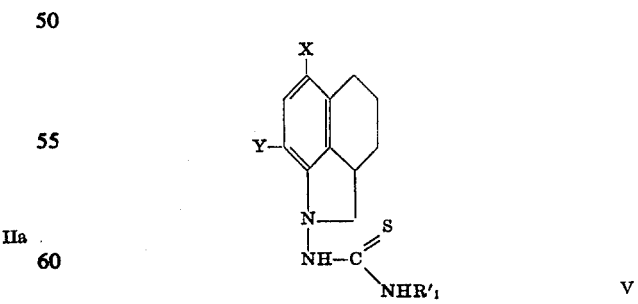

wherein X, Y and $R_1'$ are as defined above,
and this is converted into a compound of formula IIa by reaction with a lower alkyl halide or sulphate at an elevated temperature, preferably at the boiling temperature of the reaction mixture.

The new starting materials of formula IIb may be produced by reacting a compound of formula III
with N-benzoyl isothiocyanate or a mixture of ammonium rhodanide and benzoyl chloride in an inert organic solvent, e.g., a cyclic ether such as tetrahydrofuran, at an elevated temperature, preferably at the boiling temperature of the reaction mixture, to give a compound of formula VI,

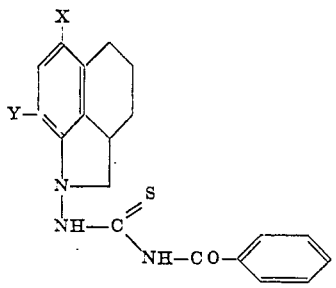

wherein X and Y are as defined above,
the compound of formula VI is hydrolyzed to a compound of formula VII,

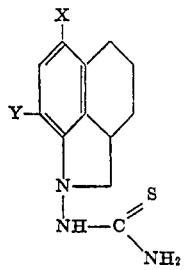

wherein X and Y are as defined above,
e.g., by heating for a short period with an aqueous sodium hydroxide solution, and the compound of formula VII is reacted, e.g., with a lower alkyl halide or sulphate, at an elevated temperature, preferably at the boiling temperature of the reaction mixture, to give a compound of formula IIb.

The hitherto unknown compounds of formula III, used as starting materials, may be produced by reducing a compound of formula VIII,

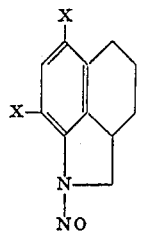

wherein X and Y are as defined above,
e.g., with zinc in formic acid or acetic acid, preferably, however, with a complex hydride of an alkali metal, such as lithium aluminum hydride or sodium dihydro-bis-(2-methoxyethoxy) aluminate, in an inert organic solvent, e.g., a cyclic or open-chain ether such as diethyl ether, at about 5° to 8° C.

When a complex aluminum hydride is used, the reaction mixture may be worked up, e.g., by adding water or a lower alkanol to the same, separating the organic phase, removing the precipitate by filtration and washing out with an inert organic solvent, e.g., an open-chain or cyclic ether such as diethyl ether or tetrahydrofuran. The combined dried organic phases are concentrated by evaporation, whereby a compound of formula III is obtained as residue.

If necessary, the compounds of formula III may be purified by reacting the same with benzaldehyde to give the corresponding benzylidenamino compounds, and hydrolyzing these under acid conditions.

The compounds of formula VIII are likewise new and may be obtained in known manner from a compound of formula IX,

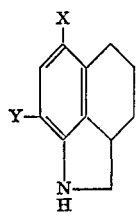

wherein X and Y are as defined above.
The process may be effected, e.g., by reacting a solution of a compound of formula IX in an excess of dilute hydrochloric acid with sodium nitrite.

The compounds of formula IXa,

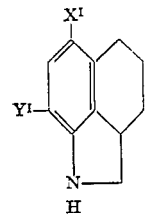

wherein
  $X^1$ is halogen, methyl or methylthio and
  $Y^1$ is hydrogen, or
  $X^1$ is hydrogen and
  $Y^1$ is methyl, or
  $X_1$ and $Y^1$ are chlorine,
are likewise new and may be produced as follows:

1. 6-Chloro-1,2,2a,3,4,5-hexahydrobenz[cd]indole may, for example, be obtained by chlorinating 1-acetyl-1,2,2a,3,4,5-hexahydrobenz[cd]indole, e.g., by passing chlorine through a solution of 1-acetyl-1,2,2a,3,4,5-hexahydrobenz[cd]indole in an inert organic solvent, e.g., a chlorinated alkane hydrocarbon such as carbon tetrachloride, at room temperature, and deacetylating the 1-acetyl-6-chloro-1,2,2a,3,4,5,-hexahydrobenz[cd]indole which crystallizes spontaneously, e.g., by heating in a mixture of glacial acetic acid/concentrated hydrochloric acid, for about 1 to 2 hours.

2. 6-Bromo-1,2,2a,3,4,5,-hexahydrobenz[cd]indole may be produced by brominating 1-acetyl-1,2,2a,3,4,5-hexahydrobenz[cd]indole and deacetylating the resulting 1-acetyl-6-bromo-1,2,2a,3,4,5-hexahydrobenz[cd]indole which crystallizes spontaneously. Bromination may, for example, be effected by the dropwise addition of bromine in an inert organic solvent, e.g., glacial acetic acid, at about 10° to 15° C, in the presence of a catalytic amount of hydrogen bromide.

Deacetylation may be effected by acid hydrolysis in a manner analogous to that described in section (1) for the production of 6-chloro-1,2,2a,3,4,5-hexahydrobenz[cd]indole.

3. 1,2,2a,3,4,5-Hexahydro-6-methylbenz[cd]indole may, for example, be produced by nitrating 1-acetyl-1,2,2a,3,4,5-hexahydrobenz[cd]indole, e.g. in glacial acetic acid, with the addition of fuming nitric acid at about 10° C, reducing the resulting nitro compound, which crystallizes spontaneously, to the corresponding amino compound, diazotizing the resulting amino compound, e.g., with sodium nitrite in sulphuric acid solution at about 0° to 5° C, reacting the resulting diazonium salt, e.g., in accordance with Sandmeyer, to give 1-acetyl-6-cyano-1,2,2a,3,4,5-hexahydrobenz[cd]indole, converting the resulting cyano compound into 1-acetyl-6-formyl-1,2,2a,3,4,5-hexahydrobenz[cd]indole, and reducing this formyl compound. This reduction may, for example, be effected in accordance with Wolff-Kishner, or in accordance with modifications and improvements thereto (e.g., Huang-Minlon process), whereby the acetyl group is simultaneously removed hydrolytically.

Reduction of the nitro compound may, for example, be effected with hydrazine hydrate in the presence of Raney nickel, in an inert organic solvent, e.g., a lower alkanol such as methanol, at an elevated temperature, preferably 50° to 60° C, and with stirring, and has a duration of about 30 minutes.

After the reaction is complete, the catalyst is filtered off and the filtrate is carefully evaporated to dryness. The resulting amino compound may be purified, e.g., by crystallization from an inert organic solvent, e.g., a chlorinated alkane hydrocarbon such as methylene chloride.

1-Acetyl-6-formyl-1,2,2a,3,4,5-hexahydrobenz[cd]indole may, for example, be obtained by adding sodium hypophosphite and Raney nickel in a mixture of glacial acetic acid/pyridine/water to the corresponding cyano compound, and stirring the mixture for an extended period at a temperature of about 10° to 25° C. Working up is effected by filtering off the catalyst and concentrating the filtrate by evaporation. The residue may be further worked up by extracting the same between water and a water-immiscible, inert organic solvent, e.g., a chlorinated alkane hydrocarbon such a methylene chloride, and concentrating the combined organic phases by evaporation. The crude formyl compound may be purified in known manner, e.g., by chromatography.

4. 6-Fluoro-1,2,2a,3,4,5-hexahydrobenz[cd]indole and 1,2,2a3,4,5-hexahydro-6-iodobenz[cd]indole may, for example, be produced in accordance with Sandmeyer from the diazonium salt described in section (3).

5. 6,8-Dichloro-1,2,2a,3,4,5,-hexahydrobenz[cd]indole may, for example, be obtained by chlorinating the 1-acetyl-6-chloro-1,2,2a,3,4,5-hexahydrobenz[cd]indole, produced as described in section (1), at an elevated temperature in an inert organic solvent, in the presence of a suitable catalyst such as iron(III)chloride, by passing chlorine through the solution, to give 1-acetyl-6,8-dichloro-1,2,2a,3,4,5-hexahydrobenz[cd]indole and deacetylating this, e.g., by heating in a mixture of acetic acid/concentrated hydrochloric acid, for about 1 to 2 hours.

6. 6-Methylthio-1,2,2a,3,4,5-hexahydrobenz[cd]indole may, for example, be produced by reacting the diazonium salt, produced as described in section (3), e.g., in accordance with Sandmeyer with methyl mercaptan, preferably in the presence of copper bronze, at a temperature of about 0° C, to give 1-acetyl-6-methylthio-1,2,2a,3,4,5-hexahydrobenz[cd]indole, and deacetylating this by alkaline hydrolysis, e.g., by boiling with an aqueous-ethanolic sodium hydroxide solution for about 30 minutes.

7. 8-Methyl-1,2,2a,3,4,5-hexahydrobenz[cd]indole may, for example, be produced from 7-methyl-gramine by quaternizing 7-methyl-gramine, e.g., with methyl iodide, reacting the quaternized compound in the presence of a strong base such as sodium hydride in an inert organic solvent, at an elevated temperature, preferably 100° to 150° C, with malonic acid diethyl ester, saponifying the reaction product by alkaline hydrolysis, e.g., by boiling for several hours with a dilute aqueous alkali hydroxide solution, and converting the resulting dicarboxylic acid by thermal decarboxylation, e.g., at 180° C, into 7-methylindole-3-propionic acid, reducing this to 7-methylindoline-3-propionic acid, e.g., with amalgamated zinc powder in a mixture of acetic acid/hydrochloric acid, and subsequently reacting with benzoyl chloride, e.g., in acetic acid in the presence of sodium acetate, to give 1-benzoyl-7-methyl-indoline-3-propionic acid, converting the resulting acid in the usual manner into its acid chloride, and subjecting this to a ring closure by a Friedel Crafts reaction, e.g., in the presence of aluminum chloride, in an inert organic solvent, e.g., a chlorinated alkane hydrocarbon such as methylene chloride, to give 1-benzoyl-1,2,2a,3-tetrahydro-8-methylbenz[cd]indole-5(4H)-one, and subsequently reducing the CO group. This reaction may, for example, be effected in accordance with Wolff-Kishner or in accordance with modifications and improvements of this process (e.g., Huang-Minlon process), whereby the benzoyl group is simultaneously removed hydrolytically.

Insofar as the production of the starting materials in not described, these are known or may be produced in accordance with known processes.

It is to be understood that the term "lower alkyl," whenever used herein means alkyl of one to four carbon atoms.

The compounds of formula I and their acid addition salts have hitherto not been described in the literature. They are characterized by interesting pharmacodynamic properties and are therefore indicated for use as medicaments.

The compounds of formula I and pharmaceutically acceptable acid addition salts thereof are useful because they possess pharmacological activity in animals. In particular, the compounds are useful vasoconstrictors as indicated by the vasoconstrictive effect observed in the test on the isolated perfused hind leg of the rabbit.

For the abovementioned use, the dosage administered will of course vary depending upon the compound employed, the mode of administration and the treatment desired. However, in general, satisfactory results are obtained in the above test at dosages between 5 and 200 $\mu$g/minute, and daily dosages are between about 1 and 100 $\mu$g/kg animal body weight. For the larger mammals, the daily dose amounts to between about 0.1 and 10 milligrams, conveniently administered in divided doses two or three times a day. Local or systemic application is suitable, and spray dosage forms or unit dosage forms for oral administration may be provided. For example, a spray dosage form for local application to the mucous membrane may contain up to about 1 milligram of active agent per millilitre of suspension of solution.

In addition to vasoconstrictor activity, the compounds exhibit certain associated central nervous system and other effects. Thus, for example, the compounds are reserpine antagonists, inhibit motility in mice and exhibit a central nervous system depressant effect. Further, the compounds exhibit a salidiuretic effect which can be attributed to the vasoconstrictor activity.

In the following Examples which illustrate the invention without in any way limiting its scope, all temperatures are indicated in degrees Centigrade and are uncorrected.

EXAMPLE 1

1,2,2a,3,4,5-Hexahydro-1-(2-imidazolin-2-ylamino)-benz[cd]indole twenty-five g of 1-(1,2,2a,3,4,5-hexahydrobenz[cd]indol-1-yl)-2-methylisothiourea hydriodide and 12.8 cc of ethylene diamine are heated to the boil in 65 cc of ethanol for 2 ½ hours. The solution is evaporated to dryness and the evaporation residue is extracted between methylene chloride and a concentrated sodium hydroxide solution. The methylene chloride solution which has been dried over magnesium sulphate is evaporated to dryness, and the 1,2,2a,3,4,5-hexahydro-1-(2-imidazolin-2-ylamino)benz[cd]indole obtained as evaporation residue is converted as such into its hydrochloride. M.P. 258°–260° from methanol/ether.

The 1-(1,2,2a,3,4,5-hexahydrobenz[cd]indol-1-yl)-2-methylisothiourea hydriodide, required as starting material, is obtained as follows:

The nitroso group is introduced into 1,2,2a,3,4,5-hexahydrobenz[cd]indole in hydrochloric acid solution at room temperature with sodium nitrite to give 1,2,2a,3,4,5-hexahydro-1-nitrosobenz[cd]indole (colorless parallelepipeds, M.P. 70°–71° from ether/petroleum ether). This is reduced with lithium aluminum hydride in ether at 5°–8°, whereby 1-amino-1,2,2a,3,4,5-hexahydrobenz[cd]indole is obtained (M.P. 59°–61° from ether/petroleum ether). The amino compound is reacted with benzoyl isothiocyanate in boiling tetrahydrofuran and is subsequently saponified with dilute sodium hydroxide solution at reflux for 10 minutes, whereby 1-(1,2,2a,3,4,5-hexahydrobenz[cd]indol-1-yl)thiourea is obtained. M.P. 182°–184° from methylene chloride/petroleum ether. The thiourea is boiled for 4 hours with methyl iodide in methanol, whereby 1-(1,2,2a,3,4,5-hexahydrobenz[cd]indol-1-yl)-2-methylisothiourea hydriodide is obtained, which crystallizes from methanol/ether. M.P. 198°–201°.

EXAMPLE 2

6-Chloro-1,2,2a,3,4,5-hexahydro-1-(2-imidazolin-2-ylamino)-benz[cd]indole

This compound is produced from 1-(6-chloro-1,2,2a,3,4,5-hexahydrobenz[cd]1-yl)-2-methylisothiourea hydriodide in a manner analogous to that described in Example 1. The resulting 6-chloro-1,2,2a,3,4,5-hexahydro-1-(2- imidazolin-2-ylamino)benz[cd]indole crystallizes from methylene chloride/petroleum ether and has a M.P. of 212°–214°.

The 1-(6-chloro-1,2,2a,3,4,5-hexahydrobenz[cd]indol-1-yl)-2-methylisothiourea hydriodide, used as starting material, is obtained as follows:

1-Acetyl-1,2,2a,3,4,5-hexahydrobenz[cd]indole is chlorinated in carbon tetrachloride at room temperature with the calculated amount of chlorine. The resulting 1-acetyl-6-chloro-1,2,2a,3,4,5-hexahydrobenz[cd]indole (M.P. 141°–143° from methylene chloride/petroleum ether) is saponified by boiling for 1 ½ hours in concentrated hydrochloric acid/glacial acetic acid to give 6-chloro-1,2,2a,3,4,5-hexahydrobenz[cd]indole (M.P. 109°–111° from ether/petroleum ether). The nitroso group is introduced into this compound in hydrochloric acid solution at 5° with sodium nitrite to give 6-chloro-1,2,2a,3,4,5-hexahydro-1-nitrosobenz[cd]indole (M.P. 123°–125° from ether). This is reduced with lithium aluminum hydride in ether at 5°–8°, whereby 1-amino-6-chloro-1,2,2a,3,4,5-hexahydrobenz[cd]indole is obtained (M.P. 74°–76 from ether/petroleum ether). The amino compound is reacted with benzoyl isothiocyanate in boiling tetrahydrofuran and is subsequently saponified with dilute sodium hydroxide solution at reflux for 10 minutes, whereby 1-(6-chloro-1,2,2a,3,4,5-hexahydrobenz[cd]indol-1-yl)thiourea is obtained. M.P. 226°–228° from methanol/ether. The thiourea is boiled for four hours with methyl iodide in methanol, whereby 1-(6-chloro-1,2,2a,3,4,5-hexahydrobenz[cd]indol-1-yl)-2-methylisothiourea hydriodide is obtained, which crystallizes from methanol/ether. M.P. 174°–177°.

EXAMPLE 3

6,8-Dichloro-1,2,2a,3,4,5-hexahydro-1-(2-imidazolin-2-ylamino)benz[cd]indole 12 g of 1-(6,8-dichloro-1,2,2a,3,4,5-hexahydrobenz[cd]indol-1-yl)-2-methylisothiourea hydriodide and 18 cc of ethylene diamine are heated to the boil in 36 cc of ethanol for 10 hours. The solution is evaporated to dryness and the evaporation residue is extracted between methylene chloride and concentrated sodium hydroxide solution. The methylene chloride solution which has been dried over magnesium sulphate is evaporated to dryness. The 6,8-dichloro-1,2,2a,3,4,5-hexahydro-1-(2-imidazolin-2-ylamino)benz[cd] indole obtained as evaporation residue crystallizes from methylene chloride/ether and has a M.P. of 200°–202°.

The 1-(6,8-dichloro-1,2,2a,3,4,5-hexahydrobenz[cd]indol-1-yl)-2-methylisothiourea hydriodide, required as starting material, is obtained as follows:

1-Acetyl-6-chloro-1,2,2a,3,4,5-hexahydrobenz[cd]indole (M.P. 141°–143° from methylene chloride/petroleum ether) is chlorinated in boiling carbon tetrachloride in the presence of iron trichloride by passing chlorine through the solution, whereby 1-acetyl-6,8-dichloro-1,2,2a,3,4,5-hexahydrobenz[cd]indole (M.P. 170°–⅔° from methylene chloride/ether) is obtained. This is boiled in concentrated hydrochloric acid/glacial acetic acid for 2 hours, whereby 6,8-dichloro-1,2,2a,3,4,5-hexahydrobenz[cd]indole is obtained (M.P. 103°–105° from ether/petroleum ether). The nitroso group is introduced into this compound in hydrochloric acid solution at 5° with sodium nitrite to give 6,8-dichloro-1,2,2a,3,4,5-hexahydro-1-nitrosobenz[cd]indole (M.P. 179°–181° from methylene chloride/petroleum ether). This is reduced with lithium aluminum hydride in ether at 5°–8° whereby 1-amino-6,8-dichloro-1,2,2a,3,4,5-hexahydrobenz[cd]indole (M.P. 101°–**° from methylene chloride/petroleum ether) is obtained. The amino compound is reacted with benzoyl isothiocyanate in boiling tetrahydrofuran and is subsequently saponified with dilute sodium hydroxide solution at reflux for 10 minutes, whereby 1-(6,8-dichloro-1,2,2a,3,4,5-hexahydrobenz[cd]indol-1-yl)thiourea (M.P. 230°–232° from methanol/methylene chloride/ether) is obtained. The thiourea is boiled for 1 hour with methyl iodide in methanol, whereby 1-(6,8-dichloro-1,2,2a,3,4,5-hexahydrobenz[cd]indol-1-yl)-2-methylisothiourea hydriodide is obtained which crystallizes from methanol/ether. M.P. 210°–212°.

EXAMPLE 4

1,2,2a,3,4,5-Hexahydro-1-(2-imidazolin-2-ylamino)-6-methylthiobenz[cd]indole 1-(1,2,2a,3,4,5-hexahydro-6-methylthiobenz[cd]indol-1-yl)-2-methylisothiourea hydriodide and ethylene diamine are boiled for 2 hours and worked up as described in Example 1. The resulting 1,2,2a,3,4,5-hexahydro-1-(2-imidazolin-2-ylamino)-6-methylthiobenz[cd]indole is converted as such into its hydrogen maleate. This crystallizes from methanol/ether and has a M.P. of 191°–192°.

The 1-(1,2,2a,3,4,5-hexahydro-6-methylthiobenz[cd]indol-1-yl)-2-methylisothiourea hydriodide, required as starting material, is obtained as follows:

1-Acetyl-1,2,2a,3,4,5-hexahydrobenz[cd]indole is nitrated in glacial acetic acid at 10° with fuming nitric acid. The resulting 1-acetyl-1,2,2a,3,4,5-hexahydro-6-nitrobenz[cd]indole (M.P. 174°–175° from methylene chloride/ether) is reduced in tetrahydrofuran/methanol at 50°–60° with hydrazine hydrate in the presence of Raney nickel to give 1-acetyl-6-amino-1,2,2a,3,4,5-hexahydrobenz[cd]indole (M.P. 147°–149° from methylene chloride/petroleum ether). The amino compound is diazotized in sulphuric acid solution at 0°–5° with sodium nitrite and the resulting diazonium salt is reacted in accordance with Sandmeyer with methyl mercaptan in the presence of copper bronze at 0° to give 1-acetyl-1,2,2a,3,4,5-hexahydro-1-methylthiobenz[cd]indole (M.P. 127°–129° from methylene chloride/ether). This is boiled in ethanol with dilute sodium hydroxide solution for 30 minutes, whereby 1,2,2a,3,4,5-hexahydro-6-methylthiobenz[cd]indole (hydrogen maleate. M.P. 121°–123° from methanol/ether) is obtained. The nitroso group is introduced into this compound in dilute hydrochloric acid/glacial acetic acid at 0° with sodium nitrite to give 1,2,2a,3,4,5-hexahydro-6-methylthio-1-nitrosobenz[cd]indole (M.P. 94°–97° from methylene chloride/ether). This is reduced with lithium aluminum hydride in ether at 5°–10°, whereby 1-amino-1,2,2a,3,4,5-hexahydro-6-methylthiobenz[cd]indole (as hydrogen maleate, M.P. 108°–109° from methanol/ether) is obtained. The amino compound is reacted with benzoyl isothiocyanate in boiling tetrahydrofuran and is subsequently saponified with dilute sodium hydroxide solution at reflux for 10 minutes, whereby 1-(1,2,2a,3,4,5-hexahydro-6-methylthiobenz[cd]indol-1-yl)thiourea (M.P. 205°–207° from methylene chloride/methanol/ether) is obtained. The thiourea is boiled for 2 hours with methyl iodide in methanol, whereby 1-(1,2,2a,3,4,5-hexahydro-6-methylthiobenz[cd]indol-1-yl)-2-methylisothiourea hydriodide is obtained, which crystallizes from methanol/ethyl acetate. M.P. 142°–144°

EXAMPLE 5

1-(1,2,2a,3,4,5-Hexahydro-8-methylbenz[cd]indol-1-yl)-2-methylisothiourea hydriodide is reacted with ethylene diamine and worked up in accordance with the process described in Example 1. The resulting 1,2,2a,3,4,5-hexahydro-1-(2-imidazolin-2-ylamino)-8-methylbenz[cd]indole is converted as such into its hydrochloride. M.P. 240°–242° from methanol/ether.

The 1-(1,2,2a,3,4,5-hexahydro-8-methylbenz[cd]indol-1-yl)-2-methylisothiourea hydriodide, required as starting material, is obtained as follows:

7-Methyl-gramine is converted into its methiodide with methyl iodide. Treatment of the methiodide with malonic acid diethyl ester in the presence of sodium hydride in boiling xylene, subsequent saponification by boiling for 7 hours in dilute sodium hydroxide solution and subsequent decarboxylation at 180° yields 7-methylindole-3-propionic acid (M.P. 117°–119° from ether/petroleum ether). This acid is reduced in dilute hydrochloric acid/glacial acetic acid at 95° with zinc dust in the presence of mercury(II)chloride to give 7-methylindoline-3-propionic acid, this is converted without characterization in glacial acetic acid with benzoyl chloride in the presence of sodium acetate at room temperature into 1-benzoyl-7-methylinodoline-3-propionic acid (M.P. 165°–167° from methylene chloride). This is treated with phosphorus pentachloride in methylene chloride at 5°–10°, whereby the acid chloride is obtained, and this is subsequently subjected to a Friedel-Crafts reaction with aluminum chloride in boiling methylene chloride, whereby 1-benzoyl-1,2,2a,3-tetrahydro-8-methylbenz[cd]indol-5(4H)-one (M.P. 169°–171° from methylene chloride/methanol/ether) is obtained. This is reacted in accordance with Huang-Minlon, whereby 1,2,2a,3,4,5-hexahydro-8-methylbenz[cd]indole is obtained with the simultaneous removal of the benzoyl group (M.P. 81°–82 from petroleum ether). The nitroso group is introduced into this compound in hydrochloric acid solution at 0°–5° with sodium nitrite, whereby 1,2,2a,3,4,5-hexahydro-8-methyl-1-nitrosobenz[cd] indole (M.P. 83°–85° from ether/petroleum ether) is obtained. This is reduced with lithium aluminum hydride in ether at 5°, whereby 1-amino-1,2,2a,3,4,5-hexahydro-8-methylbenz[cd]indole (as hydrochloride, M.P. 162°–164° from methanol/ether) is obtained. The amino compound is reacted with benzoyl isothiocyanate in boiling tetrahydrofuran and is subsequently saponified with dilute sodium hydroxide solution at reflux for 10 minutes, whereby 1-(1,2,2a,3,4,5-hexahydro-8-methylbenz[cd]indol-1-yl)thiourea (M.P. 214°–215° from methylene chloride/methanol/ether) is obtained. The thiourea is boiled for 2 hours with methyl iodide in methanol, whereby 1-(1,2,2a,3,4,5-hexahydro-8-methylbenz[cd]indol-1-yl)-2-methylisothiourea hydriodide is obtained, which crystallizes from methanol/ether. M.P. 200°–202°.

EXAMPLE 6

1,2,2a,3,4,5-Hexahydro-1-(2-imidazolin-2-ylamino)-6-methylbenz[cd]ndole

Twelve g of 1-(1,2,2a,3,4,5-hexahydro-6-methylbenz[cd]indol-1-yl)-2-methylisothiourea hydriodide and 12 cc of ethylene diamine are boiled in 60 cc of ethanol for 2 hours and worked up as described in Example 1. The resulting 1,2,2a,3,4,5-hexahydro-1-(2-imidazolin-2-ylamino)-6-methylbenz[cd]indole is converted as such into its hydrochloride. M.P. 238°–239° from methanol/ether.

The 1-(1,2,2a,3,4,5-hexahydro-6-methylbenz[cd]indol-1-yl)-2-methylisothiourea hydriodide, required as starting material, is obtained as follows:

1-Acetyl-1,2,2a,3,4,5-hexahydrobenz[cd]indole is nitrated at 10° in glacial acetic acid with fuming nitric acid. The resulting 1-acetyl-1,2,2a,3,4,5-hexahydro-6-nitrobenz[cd]indole (M.P. 174°–175° from methylene chloride/ether) is reduced in methanol at 50°–60° with hydrazine hydrate in the presence of Raney nickel, to give 1-acetyl-6-amino-1,2,2a,3,4,5-hexahydrobenz[cd]indole (M.P. 147°–149° from methylene chloride/petroleum ether). The amino compound is diazotized in sulphuric acid solution at 0°–5° with sodium nitrite and the resulting diazonium salt is converted in accordance with Sandmeyer with copper-I-cyanide at 60° into 1-acetyl-6-cyano-1,2,2a,3,4,5-hexahydrobenz[cd]indole (M.P. 169°–171° from methylene chloride/petroleum ether). This is stirred for 20 hours with sodium hypophosphite and Raney nickel in a mixture of glacial acetic acid/pyridine/water at room temperature, whereby 1-acetyl-6-formyl-1,2,2a,3,4,5-hexahydrobenz[cd]indole (M.P. 145°–147° from methylene chloride/petroleum ether) is obtained; this is converted in accordance with Huang-Minlon into 1,2,2a,3,4,5-hexahydro-6-methylbenz[cd]indole (M.P. 86°–88° from methanol/water) with a simultaneous removal of the acetyl group. The nitroso group is introduced into this compound in hydrochloric acid solution at 5° with sodium nitrite to give 1,2,2a,3,4,5-hexahydro-6-methyl-1-nitrosobenz[cd]indole (M.P. 103°–105° from ether). This is reduced with lithium aluminum hydride in ether at 5°–8°, whereby 1-amino-1,2,2a,3,4,5-hexahydro-6-methylbenz[cd]indole (as hydrochloride, M.P. 185°–187° from methanol/ether) is obtained. The amino compound is reacted with N-benzoyl isothiocyanate in boiling tetrahydrofuran and is subsequently saponified with dilute sodium hydroxide solution at reflux for 10 minutes, whereby 1-(1,2,2a,3,4,5-hexahydro-6-methylbenz[cd]indol-1-yl)thiourea is obtained (M.P. 209°–211° from methylene chloride/methanol). The thiourea is boiled for 2 hours with methyl iodide in methanol, whereby 1-(1,2,2a,3,4,5-hexahydro-6-methylbenz[cd]indol-1-yl)-2-methylisothiourea hydriodide is obtained, which crystallizes from methanol/ether. M.P. 167°–169°.

What is claimed is:

1. A compound of the formula:

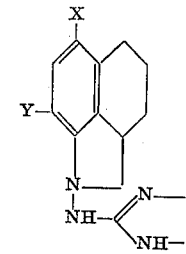

wherein X is hydrogen, halogen, methyl or methylthio and Y is hydrogen, or X is hydrogen and Y is methyl, or X and Y are chlorine, or a pharmaceutically acceptable acid addition salt thereof.

2. The compound of claim 1, which is 1,2,2a,3,4,5-hexahydro-1-(2-imidazolin-2-ylamino)-benz[cd]indole.

3. The compound of claim 1, which is 6-chloro-1,2,2a,3,4,5-hexahydro-1-(2-imidazolin-2-ylamino)-benz[cd]indole.

4. The compound of claim 1, which is 6,8-dichloro-1,2,2a,3,4,5-hexahydro-1-(2-imidazolin-2-ylamino)-benz[cd]indole.

5. The compound of claim 1, which is 1,2,2a,3,4,5-hexahydro-1-(2-imidazolin-2-ylamino)-6-methylthiobenz[cd]indole.

6. The compound of claim 1, which is 1,2,2a,3,4,5-hexahydro-1-(2-imidazolin-2-ylamino)-8-methylbenz[cdindole.

7. The compound of claim 1, which is 1,2,2a,3,4,5-hexahydro-1-(2-imidazolin-2-ylamino)-6-methylbenz[cd]indole.

* * * * *

UNITED STATES PATENT OFFICE
CERTIFICATE OF CORRECTION

Patent No. 3,674,801                    Dated July 4, 1972

Inventor(s) GERHARD BORMANN, JOHN GMUNDER, HEINRICH WILKENS
FRANZ TROXLER

It is certified that error appears in the above-identified patent and that said Letters Patent are hereby corrected as shown below:

Column 5, line 10, " a " should read -- as --.

Column 5, line 69, " in " should read -- is --.

Column 6, line 74, "[cd] 1-yl)" should read -- [cd] indole 1-yl)-.

Column 7, line 21, " 74°-76 " should read -- 74°-76° --.

Column 7, line 56, " 170°-2/3° " should read -- 170°-172° --.

Column 7, line 67, " 101°-**° " should read -- 101°-103° --.

Column 8, line 32, "hexahydro-1 " should read -- hexahydro-6 --.

Column 8, lines 55-59, title is missing, there should be the title 1,2,2a,3,4,5-Hexahydro-1-(2-imidazolin-2-ylamino)-8-methylbenz

[cd] indole.

Column 9, line 17, " 81°-82 " should read -- 81°-82° --.

Column 10, line 56, " [cd indole. " should read --[cd] indole.--.

Signed and sealed this 16th day of July 1974.

(SEAL)
Attest:

McCOY M. GIBSON, JR.                    C. MARSHALL DANN
Attesting Officer                       Commissioner of Patents